3,228,928
PERIODATE MODIFIED POLYGALACTOMANNAN GUM AND METHOD OF PREPARING SAME
Joseph W. Opie, Minneapolis, and James L. Keen, New Brighton, Minn., assignors to General Mills, Inc., a corporation of Delaware
No Drawing. Filed June 27, 1963, Ser. No. 290,906
14 Claims. (Cl. 260—209)

This is a continuation-in-part application of our copending application Serial No. 47,610, filed August 5, 1960, now abandoned, which was a continuation-in-part application of our application Serial No. 824,771, filed July 3, 1959, now abandoned.

This invention relates to a novel method of preparation of periodate modified polygalactomannan gums and to the products thereof. In particular this invention relates to a granular form of a periodate oxidized polygalactomannan gum in which substantially only the galactose units have been oxidized.

Guar gum is a polygalactomannan gum in which the structural chain is made up of D-mannose units with 1–4 linkages. A D-galactose unit is linked 1–6 on the average of every second D-mannose unit of the chain. The ratio of galactose to mannose is therefore 1 to 2. Locust bean gum is also a polygalactomannan gum of similar molecular structure in which the ratio of galactose to mannose is 1 to 4.

It has been found that useful products can be made by oxidizing the above systems with less than stoichiometric amounts of periodate. It has been further found that the anhydrogalactose units are preferentially attacked ahead of the anhydromannose units when these reduced ratios of periodate are employed. With guar, it is thus possible to prepare a product consisting essentially of a polyanhydromannose chain, substituted at every other number 6 position with a hydroxycarbonyl system. Such products in which only the galactose units or substantially only the galactose units have been oxidized are found to be excellent additives in the production of paper, generally being added in the beater, head box, fan pump or regulator box.

Periodic acid and periodates have frequently been used as an analytical tool with carbohydrates to help determine the nature of the product rather than as a preparative method. For this use an excess of periodic acid or periodate is used, and all available hydroxyl systems are attacked. Galactomannan gums are quickly hydrated becoming sticky even in dilute solutions thereof. It is therefore difficult to conduct chemical reactions on galactomannan gums without taking the materials into very dilute solutions, i.e. 1% or less, thus creating expensive isolation problems and handling problems due to the large amount of water employed. When periodate oxidation is conducted with a very dilute aqueous solution, large amounts of water are required. With such large amounts of water, the very dilute solution apparently prevents any crosslinking so that the oxidized product remains soluble. This presents an expensive isolation problem in that it becomes necessary to use large volumes of an organic solvent to insolubilize the product. This then results in additional amounts of materials for handling and an added expense of solvent use. The solvent must then be recovered. In addition, recovery of the resulting iodic acid after oxidation from the solvent mixture for regeneration back to the periodic acid form for subsequent reuse is rendered impractical and uneconomical with the large amounts required to be handled. Thus the use of aqueous sysems has distinct disadvantages, particularly from an economic and handling standpoint.

A method has now been discovered which is not subject to such disadvantages and which results in a product having a desirable granular form. This novel system takes advantage of the fact that gums that have been oxidized with periodic acid are substantially insoluble in water, once oxidized. Thus in this system, the gum is not dissolved in water to make a very dilute solution, but rather the oxidation is conducted on a substantially dry gum, one having a water level less than 20% and generally between 10 and 15%. During the reaction the substantially dry gum is agitated at a speed sufficient to insure that all particles of the gum are presented for reaction and prevent undue localized swelling of the gum. During agitation, a periodic acid solution or a solution of a salt thereof is slowly added to the mixer. As the reaction occurs, the periodate oxidized gum is formed which is insoluble in water apparently because crosslinking occurs, probably through the formed aldehyde group, through hemiacetal linkages. Because of the aqueous insolubility of the product, the iodic acid formed during the reaction can be removed and recovered by simple washing of the mixture with water and recovering the filtrate. The iodic acid can then be converted by electrochemical methods to periodate acid for reuse. This method thus eliminates the necessity for employing any organic solvents thus avoiding additional great expense and handling. With the elimination thereof, no necessity arises for separation of the iodic acid from the organic solvent, thus eliminating additional steps.

It is therefore an object of this invention to provide a novel method of preparing periodate oxidized galactomannan gums.

It is also an object of this invention to provide a low level oxidized polygalactomannan gum by said process to provide a desirable granular form.

Briefly, the invention comprises the oxidation of a polygalactomannan gum by a periodate in which from 0.01 to 1.0 mole of periodate is used per 1.0 mole of anhydrous hexose unit. The process of this invention is particularly suitable for the preparation of the lower level oxidized products, in which from 0.01 to 0.5 mole of periodate are employed and preferably from 0.03 to 0.15 mole. The oxidizing agents which may be employed in this invention are the periodic acids particularly paraperiodic acid, and the alkali metal salts of periodic acids, such as sodium and potassium periodate, and the like.

The ratio of galactose to mannose in the guar polymer is one to two. With guar, after oxidation with 0.25 mole periodate per anhydrous hexose unit, the ratio of galactose to mannose is found to be about one to three, thus indicating that the galactose is preferentially attacked by the periodate. Thus oxidation of the guar with periodic acid will yield a long polymeric chain of mannose units that are partially substituted with aldehydic functions on every other unit of the chain. The aldehydic function is due to the formation of carbonyl groups during the cleavage of galactose units by the periodate. Thus the gums are sometimes referred to as aldehyde gums.

Although the invention is not dependent thereon, it is believed that the molecular structure of the gum is changed by reaction with the periodic acid with a substantial number of the anhydrogalactose units of the gum essentially as follows using guar gum as an illustration.

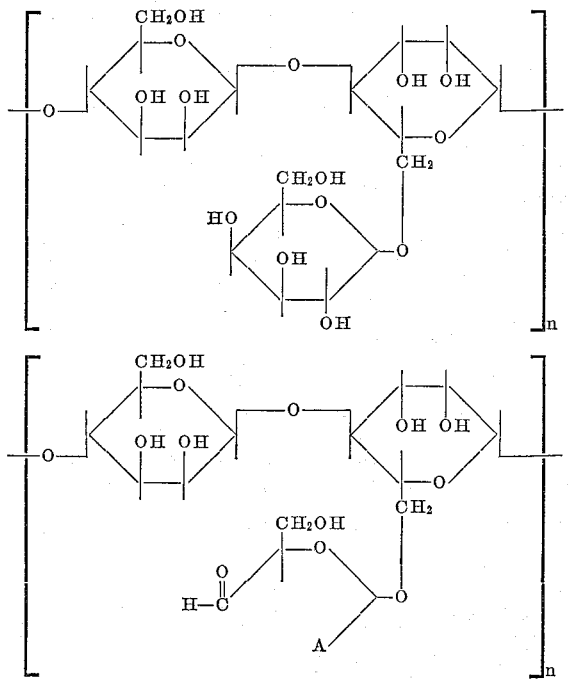

where A is substantially

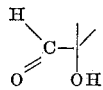

with the formation of some

The action of the periodate can best be illustrated by means of the following examples.

EXAMPLE I 0.4915 g. of purified guar gum was dissolved in 50 cc. of distilled water. 0.1623 g. of sodium periodate dissolved in 10 cc. of water was added. This represents a ratio of 0.25 mole of periodate per mole of anhydrous hexose unit. The volume was adjusted to 100 cc. and the mixture allowed to stand overnight at 4–5° C.

The product was reduced and hydrolyzed. The unoxidized hexose units were separated by paper chromatography. A colorimetric determination showed the ratio of galactose to mannose to be 1 to 3.4, thus indicating that the attack was made preferentially on the galactose unit.

EXAMPLE II

A sample of guar was ozidized in a manner identical to Example I. After reduction and hydrolysis, the amounts of glycerol and erythritol were determined. The ratio of glycerol to erythritol was found to be 4 to 1, again indicating preferential attack on the galactose unit since glycerol would have come only from this hexose unit.

The foregoing oxidations were used merely to illustrate the selective oxidation of the gums, indicating that substantially only the galactose units are oxidized, the mannose units being substantially unoxidized. However, such a method of preparation of the gums forms no part of this invention and has various disadvantages previously mentioned. The product obtained by using the aqueous system is water soluble and can be recovered only with difficulty and with attendant large expense. Also periodates are expensive and some means must be provided for recovering their reduced products and regenerating the periodate so that it may be used again. In order to recover the reduced products, it is necessary that the gum used in the reaction remain in a granular state so that it can be filtered or otherwise recovered from the reaction mixture. The filtrate in turn will contain the iodate which can be regenerated to the periodate. In the aqueous system of oxidation, the product resulting is soluble and additional means are necessary to insolubilize the gum. This generally will involve the use of large amounts of organic solvents in which the gum is insoluble with accompanying expense in handling and recovery of the solvents. Such means of recovery are impractical and expensive. In the present method of this invention, the oxidized gum is provided in a granular state and the product is insoluble in water so that it can be recovered by an inexpensive practical manner.

As previously indicated, this method, which is most practical and least expensive, consists in intimately mixing the substantially dry gum, one having a water level less than 20% and generally having a water content of about 10–15%, while a periodic acid solution or solution of a salt of periodic acid is uniformly added, dripped, or sprayed onto the dry gum so that the water content in the reaction system is not more than 80%. As the reaction occurs, the insoluble periodic oxidized gum results and when the reaction is complete, the iodic acid formed during the reaction can be removed and recovered simply by working the mixture with water, filtering and recovering the filtrate. This is possible because the oxidized gum provided by this method is insoluble. In the other aqueous method, such simple procedure is not possible as the product remains in solution after the oxidation and additional subsequent steps are first necessary to insolubilize the gum.

In this novel method, one part of gum having a moisture content less than 20% by weight, and preferably 10–15% is intimately mixed with the uniform addition of 1 to about 3.5 parts of acidic water containing the desired amount of periodic acid or its salts. In general, a 0.1 to 0.5 molar solution of the oxidizing agent is employed, and preferably a 0.2 to 0.4 molar solution is used, particularly with the lower level oxidized products. Higher molarity solutions tend to give poor products from a homogeneity standpoint while lower molarity results in undue swelling of the gum from the additional water present in the solution which results in poor washing characteristics. As indicated, from 1 to about 3 parts of the oxidizing agent solution is employed. The amount will vary dependent on the molarity of the solution employed, the moisture content of starting gum and the particular level of oxidizing desired. With 0.325 molar solution about 3.1 liters thereof is required for 1.8 kilograms of gum, as is (containing 10–12% moisture). In practice metered streams of gum and oxidizing agent solution are used, the periodate solution being injected through an orifice in the shell of the reaction vessel just after the solids gum feed port. The reaction is substantially complete in about 30 seconds under this practice. The resulting product using the 0.325 molar solution at the rate of 3.1 liters thereof to 1.8 kilograms of gum as is, contains about 67% moisture. This product is substantially a dry granular form of product. The product is substantially dry to the touch resembling somewhat a dampened sand, sawdust or present day dry granular rug cleaning powder.

As is apparent from the foregoing, the oxidation process is a continuous one rather than a batch process. It can be described generally as the mixing of two metered streams, the substantially dry gum and the periodate oxidizing solution at a rate to provide from 0.01 to 0.5 mole of oxidizing agent per anhydrous hexose unit employing a solution of oxidizing agent at from 0.1 to 0.5 molarity.

At 0.325 molarity, 3.1 liters of oxidizing agent solution to 1.8 kilograms of a gram containing about 10–12% moisture will provide 0.10 mole of periodate per anhydrous unit. Thus in essence the method comprises the mixing of two metered streams of materials, the first stream being a substantially dry gum and the second stream being an aqueous solution of an oxidizing agent selected from the group consisting of periodic acid and the alkali metal salts thereof having a molarity of from 0.1 to 0.5 at a rate to provide from 0.01 to 0.5 mole of oxidizing agent per anhydrous hexose unit, to provide a product having not more than about 80% moisture. If the moisture present in the reaction and in the final product is substantially in excess of 80%, swelling tends to take place which poses problems of handling particularly in subsequent recovery procedures.

The recovery procedures, which represent a secondary feature of this invention, are as follows. After the reaction is conducted as described above, the product is discharged onto a belt conveyor with variable speed drive, the speed being set to provide an aging time to ensure sufficient time for insolubilization as previously described, without permitting undesirable side reactions. In practice an aging time of about 30 minutes is employed and preferably about 1 hour although aging times as low as about 10 minutes may be sufficient. This aging is found desirable to provide for more efficient and practical washing and subsequent recovery steps. The aging time should not be so prolonged or at such a temperature to allow for the formation of iodine from the reduction of iodic acid by product which tends to further oxidize the gum and which is subsequently to be recovered for conversion to periodic acid for reuse. As previously indicated the iodic acid formed is recovered and later converted to periodic acid by electrochemical means. If substantial amounts of iodine are allowed to form this recovery and conversion becomes more difficult and uneconomical, the presence of iodine indicating the extent of undesirable side reaction. Generally, aging is conducted at room temperature. At this temperature aging for up to one day does not appear to present any undue problems. Of course, if the iodic acid is not to be recovered for conversion to periodic acid and subsequent reuse, the aging is of lesser importance except in so far as it may affect the subsequent washing characteristics of the product. In some applications, it may be possible to use the gum product as is if the presence of the iodic acid and any formed iodine is not detrimental for the particular use to which the product is put, although this would in general be uneconomical.

After the aging, if conducted, the product is slurried in a wash tank with water to remove the iodate from the reaction mixture. The time of slurrying is dependent on various factors and the optimum time is selected to provide the most desirable characteristics for subsequent recovery. In practice, with the reactants and conditions previously described, a slurrying time of about 5 minutes was found most desirable. Generally, this time may vary as a practical matter from about 2 minutes to about 1 hour, however, not more than 15–30 minutes is generally employed. In general from 2 of 4 parts of water per part of dry, but moist gum product i.e. the 67% product previously described, is employed in this slurrying step. Under the conditions previously described, about 3 parts water per part of gum are employed in practice. The solid product is then separated by centrifugation with washing with water to remove any residual iodate. The product leaving the centrifuge, in practice contains a moisture content of about 70%, being substantially dry to the touch as previously described.

This water insoluble product is generally employed commercially in a water soluble form. The water insoluble forms of iodate-free aldehyde gums can be made water soluble by reacting them with a slight excess of $NaHSO_3$, about 2 moles of $NaHSO_3$ per mole of periodate generally being used in the production of the soluble aldehyde gum bisulfite product. This is readily done by intimately mixing the correct amount of bisulfite with moist aldehyde gum and drying the resulting mixture. This procedure gives the bisulfite reaction compound of aldehyde gum which is readily water soluble. The product is generally supplied commercially in a dry form containing about 10% moisture.

As indicated above, the recovery system described represents a secondary feature of the invention which further provides a practical and economical method feasible from a commercial standpoint. While this recovery system has been described in detail, it is understood that the novel means of oxidizing the polygalactomannan gums represents the primary feature of this invention.

The invention can be further illustrated by means of the following examples.

EXAMPLE III 160 g. (dry weight) of commercial locust bean gum was placed in a small laboratory mixer of the Baker Perkins type and 400 cc. of acid solution containing 0.2 mole of periodate was added over a 45 minute period. The resulting aldehyde locust bean gum product was washed three times with cold tap water. The product was collected by centrifuging after each washing. The resulting product was washed twice in 1 liter portions of acetone to remove water and dried. The product was mixed with boiling dilute $NaHSO_3$ and used successfully as a wet end paper additive.

EXAMPLE IV 160 g. (dry weight) of commercial guar gum was placed in a small Readco laboratory mixer and 400 cc. of slightly acid solution containing about 0.05 mole of periodate was added over a 45 minute period. The resulting aldehyde guar gum product was washed three times with tap water. The product was collected by centrifuging after each washing. The moist washed product was placed in a laboratory Brabender mixed and well mixed with 15.6 g. of $NaHSO_3$. The product was then dried on a laboratory steam heated drum drier. The product was water soluble and was successively used as a wet end paper additive.

EXAMPLE V 160 g. (dry weight) of commercial guar gum was placed in a small Readco laboratory mixer and 300 cc. of slightly acid solution containing about 0.05 mole of periodate was added over an hour period. About 488 g. of product was obtained. This was dried to 215 g. in a small gas heated laboratory rotary drier. The dried product was suspended in about 850 cc. of water and collected in a basket centrifuge. The product was washed in the centrifuge with about 300 cc. of water. 830 cc. of washings containing 80% of the resulting $IO_3-$ were obtained. The product was resuspended in about 1 liter of water and again collected in the centrifuge; 850 cc. of washing containing 10% of the resulting $IO_3^-$ were obtained; 430 g. of dry, moist product were obtained. The moist product was well mixed with 18 g. of $NaHSO_3$ in a laboratory mixer. It was then dried in the small gas heated laboratory rotary drier. 200 g. of product containing 14% moisture was obtained.

Carob or guar gums work equally well in all examples shown. The examples described above are laboratory scale preparations. The examples which follow below will serve to illustrate the preferred embodiment as conducted on a pilot plant or commercial scale.

EXAMPLE VI

Four hundred pounds of guar gum having a moisture content of about 10–12% and 588 pounds of an acidic solution of periodic acid having a molarity of 0.312 were mixed efficiently in a continuous mixer. The solution was injected through an orifice in the shell of the mixer just after the feed port of the dry gum. The solution feed rate was 6.9 to 7.0 pounds per minute and the gum feed rate was 4.7 to 4.9 pounds per minute. This provided about 0.075 mole of periodic acid per anhydrous hexose unit.

The resulting oxidized product was then aged for ten minutes on a belt conveyor and any lumps broken up in a coarse grinder. The product was then transported to another building for washing after about 1 hour. The product was then washed in 50 pound batches suspended in water for about 5 minutes after which it was collected and washed in a centrifuge until essentially free from $IO_3^-$. The dry, but moist, product was obtained in a 91.4% yield and had a moisture content of 67.4%.

The product was then dried to 50.4% moisture content and mixed well with 87.4 pounds of $NaHSO_3$ until the bisulfite adduct formed. This adduct was then dried to 10.9% moisture content. The product was then used successfully as wet end paper additive and found to provide increased wet strength.

These periodate oxidized gums find particular utility in paper formation functioning as a wet and dry strength additive. They are normally employed as a beater additive.

In order to more fully illustrate the utility of the modified gums, handsheets were prepared from bleached kraft pulp of about 650 Schopper-Riegler Freeness. The pulp was made with HCl to a maximum pH near 4, prior to handsheet formation. For comparison, commercial samples of unmodified guar and locust bean gums were used in the same manner. The results obtained are shown in the following Table I, in which it is apparent that the products prepared employing from 0.025 to about 0.25 mole of oxidizing agent are particularly useful.

an amount of from 1 to 3.5 parts of solution per one part of gum by weight, said oxidizing agent being employed in an amount of from 0.01 to 0.5 mole per anhydrous hexose unit in said gum, and the total water content in the reaction system being not more than 80% by weight.

2. A process as defined in claim 1 in which said substantially dry gum has a water content below 20%.

3. A process as defined in claim 1 in which substantially dry gum has a water content of from 10–12% by weight.

4. A process as defined in claim 3 in which said polygalactomannan gum is guar gum.

5. A process as defined in claim 4 in which said solution of oxidizing agent has a molarity of from 0.2 to 0.4 and is employed in an amount of about 3.1 liters per 1.8 kilograms of said substantially dry gum thereby providing about 0.1 mole of oxidizing agent per anhydrous hexose unit in said gum, said oxidizing agent being periodic acid and thereby providing a periodate modified polygalactomannan gum having a moisture content of about 67% by weight.

6. A process as defined in claim 1 in which said solution of oxidizing agent has a molarity of from 0.2 to 0.4.

7. A process as defined in claim 1 in which said polygalactomannan gum is guar gum.

8. A process as defined in claim 1 in which said polygalactomannan gum is locust bean gum.

9. A process as defined in claim 1 in which from 0.03 to 0.15 mole of said oxidizing agent are employed per anhydrous hexose unit.

10. A process as defined in claim 1 and further comprising aging the oxidized product prior to washing and recovery of the periodate modified polygalactomannan gum.

11. A process as defined in claim 10 in which said aging is conducted at room temperature for from 10 minutes to 24 hours.

*Table I*

| Product | Moles $IO_4^-$ Per Hexose Unit | (Control) | Pounds Burst Per 100 Pounds Ream Weight ||||||
|---|---|---|---|---|---|---|---|---|
| | | | Dry Burst ||| Wet Burst Approximately (15 min. soaking) |||
| | | | Percent Additive based on Pulp Solids |||||||
| | | | 1.0% | 2.5% | 5% | 0 | 1.0% | 2.5% | 5.0% |
| Commercial Guar Gum | | 129 | 150 | 152 | 158 | 5 | 5 | 5 | 5 |
| Do | | 127 | 141 | 145 | 146 | 5 | 5 | 5 | 5 |
| Commercial Locust Bean Gum | | 126 | 140 | 147 | 141 | 5 | 5 | 5 | 5 |
| Do | | 129 | 147 | 154 | | 5 | 5 | 5 | |
| Modified Guar Gum | 0.025 | 127 | 144 | 150 | 154 | 5 | 23 | 31 | 42 |
| Do | 0.050 | 127 | 144 | 148 | 150 | 5 | 27 | 38 | 49 |
| Do | 0.10 | 128 | 144 | 145 | 155 | 5 | 32 | 44 | 58 |
| Do | 0.20 | 130 | 141 | 144 | 148 | 5 | 31 | 34 | 48 |
| Do | 0.50 | 130 | 131 | 128 | 135 | 5 | 9 | 11 | 20 |
| Modified Locust Bean Gum | 0.1 | 123 | 163 | 167 | | 5 | 49 | 72 | |
| Do | 0.2 | 123 | 144 | 158 | | 5 | 32 | 44 | |
| Do | 0.5 | 129 | 147 | 146 | | 5 | 31 | 37 | |
| Do | 0.1 | 126 | 142 | 151 | 151 | 5 | 43 | 51 | 60 |
| Do | 0.2 | 126 | | 147 | 150 | 5 | | 49 | 60 |
| Do | 0.5 | 129 | 135 | 141 | | 5 | 15 | 19 | |

Having thus described our invention, we therefore claim:

1. A continuous process of preparing a periodate modified polygalactomannan gum comprising reacting two metered streams of material, one stream comprising a substantially dry polygalactomannan gum, the second stream comprising an aqueous acidic solution of an oxidizing agent selected from the group consisting of periodic acid and the alkali metal salts thereof, said solution having a molarity between 0.1 to 0.5 and being employed in 12. A process as defined in claim 10 in which said aging is conducted at room temperature for about 30 minutes.

13. A process as defined in claim 10 in which said washing comprises slurrying of one part of said oxidized gum with from 2 to 4 parts of water by weight for from 2 to 60 minutes.

14. A process as defined in claim 10 in which said slurrying is conducted for about 5 minutes.

(References on following page)

References Cited by the Examiner

UNITED STATES PATENTS

| | | | |
|---|---|---|---|
| 2,478,767 | 8/1949 | Locke | 260—144 |
| 2,516,634 | 7/1950 | Kesler et al. | 260—209 |
| 2,803,558 | 8/1957 | Fronmuller | 260—209 |
| 2,879,268 | 3/1959 | Jullander | 260—209 XR |
| 2,880,236 | 3/1959 | Mehltretter et al. | 60—233.3 XR |
| 2,894,944 | 7/1959 | Paschall | 260—209 XR |
| 2,900,268 | 8/1959 | Rankin et al. | 260—209 |
| 2,917,506 | 12/1959 | Caldwell et al. | 260—209 |
| 2,988,455 | 6/1961 | Rosenberg et al. | 260—233.3 |
| 3,033,851 | 5/1962 | Schaefer et al. | 260—233.3 |
| 3,080,355 | 3/1963 | Muller | 260—209 |
| 3,086,969 | 4/1963 | Slager | 260—209 |

LEWIS GOTTS, *Primary Examiner.*

CHARLES B. PARKER, *Examiner.*